UNITED STATES PATENT OFFICE.

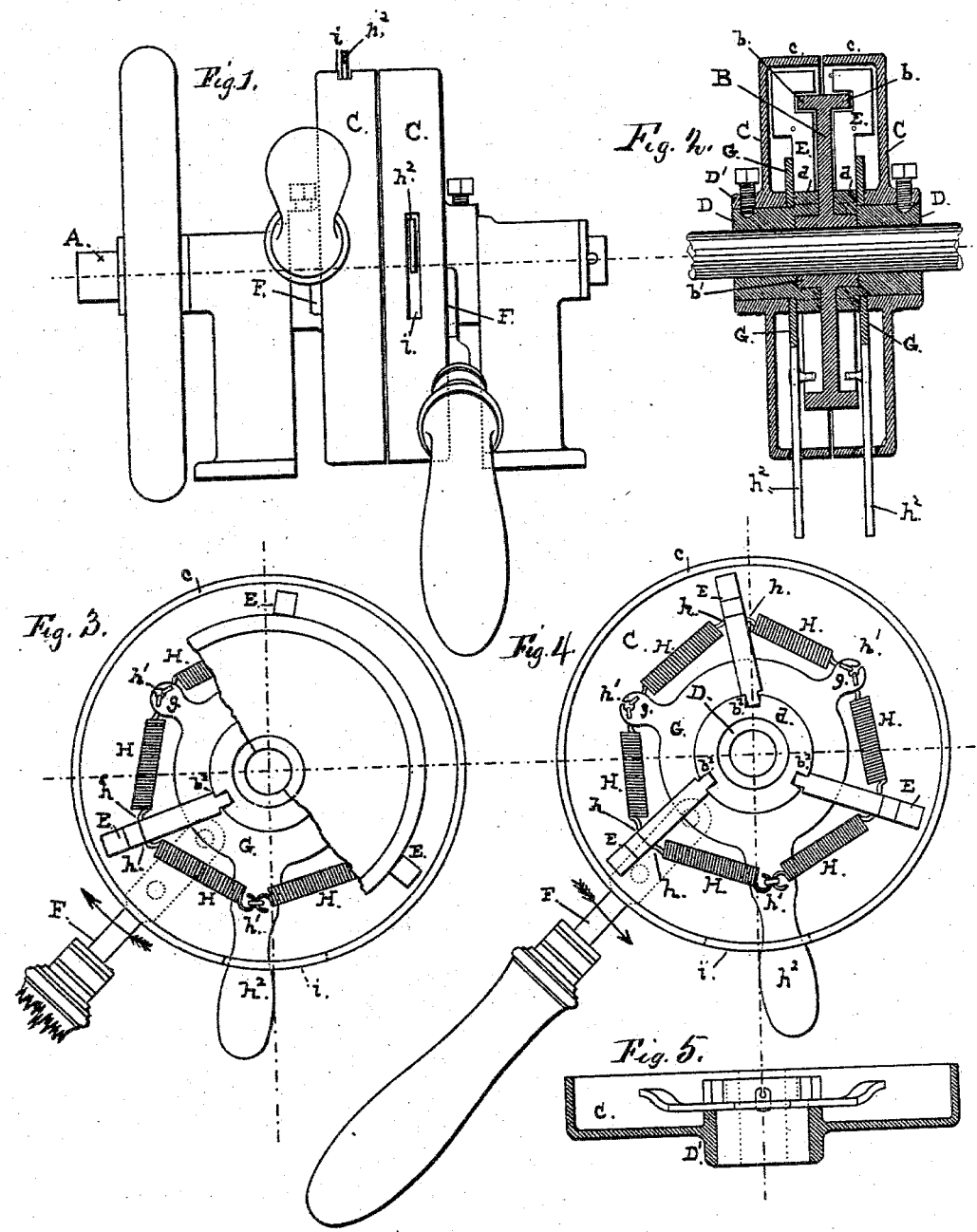

ALPHONSO B. SMITH, OF SAN FRANCISCO, CALIFORNIA, ASSIGNOR OF ONE-HALF TO SOLON PATTEE, OF SAME PLACE.

FRICTION GRIPPING DEVICE.

SPECIFICATION forming part of Letters Patent No. 288,879, dated November 20, 1883.

Application filed November 10, 1882. (No model.)

*To all whom it may concern:*

Be it known that I, ALPHONSO BUDD SMITH, a citizen of the United States, residing in the city and county of San Francisco, State of California, have made and invented certain new and useful Improvements in Friction Gripping Devices or Clutches for Converting Motion; and I do hereby declare that the following is a full, clear, and exact description of the same, reference being had to the accompanying drawings, which form a part of this specification.

My invention relates to friction gripping devices or clutches that are employed to convert rectilinear motion—as of a treadle—or reciprocating or oscillating—as of a rod or lever—into rotary motion.

It consists in certain novel construction and combination of parts, as more particularly described hereinafter, whereby I am enabled to produce a much simpler and more effective reversible gripping device or friction-clutch than has been heretofore made.

The following description fully explains the nature of my improvement and the manner in which I proceed to construct, apply, use, and operate it.

My improvement in this class of friction-clutches consists in producing both the direct and the reverse motion of the grip by or from the same set of dogs or gripping mechanism, instead of employing separate mechanism to work the grip for each direction of motion.

The accompanying drawings herein referred to show, in Figure 1, an outside view of a clutch or reversible grip applied to rotate a shaft. Fig. 2 is a horizontal section through Fig. 1. Figs. 3 and 4 are views showing the inside of the cases that carry and operate the dogs, one view showing the dogs in position to act in a direction the reverse to that of the other view. Fig. 5 is a section through one of the cases, showing the reversing-plate and the hub in which the ends of each dog have a fulcrum-bearing.

A represents any shaft to which such a rotating mechanism may be applied.

B is the flanged disk keyed thereto, and having a double flange or rim, $b\ b$, for the dogs to act upon.

C C are two caps or cases, loose on the shaft A, and capable of independent motion of the shaft and also of each other.

D D are the hubs to which these cases are secured. These hubs take over the hub $b'$ of the disk B, but are free to turn smoothly over it and upon the shaft A. The cases are cup-shaped, and are placed together upon opposite sides of the disk B, so that their rims $c\ c$ cover and inclose the disk and their dogs E.

Secured to the outside of each case is a lever, F, and by the alternate reciprocating motion given to the two levers the dogs engage with the flanged disk B in one direction, but slip over it without turning it when moving in the opposite direction. By operating these levers in an alternate manner, continuous rotation of the shaft is produced, and by operating them in the same direction together the rotation will be intermittent. In the construction given in the drawings the ends of these levers are furnished with handles for working the grip by hand; but these are dispensed with in making connection of the levers with a motive agent.

The gripping-dogs E are three in number. They are placed at equal distances apart, and have their ends set loosely into slots or recess $f'\ f'$, that are provided in the edge of the hub for a fulcrum and bearing-point to each dog. Connection of each dog to a movable circular plate, G, is made by stiff spiral springs H H, one at each side of a dog, attached at one end, $h$, to the side of the dog and at the other end, $h'$, to a projecting ear, $g$, on the margin of the plate. These springs are employed to hold out the slotted ends of the dogs in working position. The movable plate surrounds the hub, and is slipped on it to rest against the shoulder formed by the longer head or collar $d$, that receives the ends of the dogs, as seen in Fig. 2. This plate serves the double purpose of supporting the dogs and holding them in position for action and of throwing them to one side or the other of a radial line to produce reverse motion. To effect this double action the plate is made to slip freely around on the hub whereon it is confined, and an arm or extension, $h^2$, is carried from one side of its margin through a slot, $i$, in the rim of the case, and constitutes a lever by which the plate can be shifted forward or back, the slot $i$ being long enough to allow the dogs to be thrown as much to one side as to the other of a central radial line. In that position of the dogs given in Fig. 3 of the drawings the lever $h^2$ is thrown over to the extreme left, and the direction of motion of the disk will take place as indicated by the arrow, while in the position shown in Fig. 4 the dogs are thrown to the opposite side, and the disk will operate in the opposite direction. If the dogs are set upon a radial line, they will slip upon the rim of the disk B without biting, and no movement of the shaft will take place. This position is obtained by setting the lever $h^2$ in the center of the slot, and thus either or both of the grips C C can be thrown into and out of action as desired. This construction greatly simplifies and reduces the cost of such mechanism, while at the same time it adds to its effectiveness. The reversing mechanism is more certain as well as more rapid in its action, and the durability of the parts is increased in a large degree. As applied and combined together in this manner, the device furnishes an effective means of producing rotary motion in a shaft from reciprocating motion obtained from a treadle, rod, or other means of applying a motive power, by simply connecting the levers with such mechanism.

Having thus fully described my invention, what I claim, and desire to secure by Letters Patent, is—

1. In a friction-grip, the combination, with the gripping-disk fixed to the shaft to be rotated, of the cases C, each having the reversible dogs F F, a reversing-plate, G, to which each dog is attached by means of springs H H, and a means of turning the reversing-plate from the outside of the cases to change the position of the dogs.

2. In a friction-grip, the combination, with the case C, of the hub D, having fulcrum-bearing for the ends of the dogs, the reversing-plate G, the dogs attached thereto by springs H H, and the reversing-lever working through a slot in the case.

3. In a reversible friction-grip, a set of dogs having the inner ends set in bearings in hub or central collar, and their slotted ends held out radially from the collar and in position to engage with the gripping-flange by springs applied on each side of a dog, and connecting each one to a reversing-plate adapted to be turned from the outside of the grip, whereby the same set of dogs is made to produce rotation in either direction by simply changing the position of their outer ends.

4. A double-acting reversible friction-grip, consisting of the double-flanged disk, the cup-shaped disks C, with actuating-levers F, the set of dogs in each disk having their inner ends set in the central hub or collar, the central reversing-plate, G, and means for turning it from the outside of the grip, and the sets of springs H H, connecting each dog E on both sides to the reversing-plate, all combined together for operation, substantially as hereinbefore described.

ALPHONSO B. SMITH. [L. S.]

Witnesses:
G. A. DICKSON,
EDWD. E. OSBORN.